3,346,333
DEHYDRATION OF MAGNESIUM CHLORIDE UTILIZING FLUID BED SPRAY DRYING IN ATMOSPHERE OF HCl

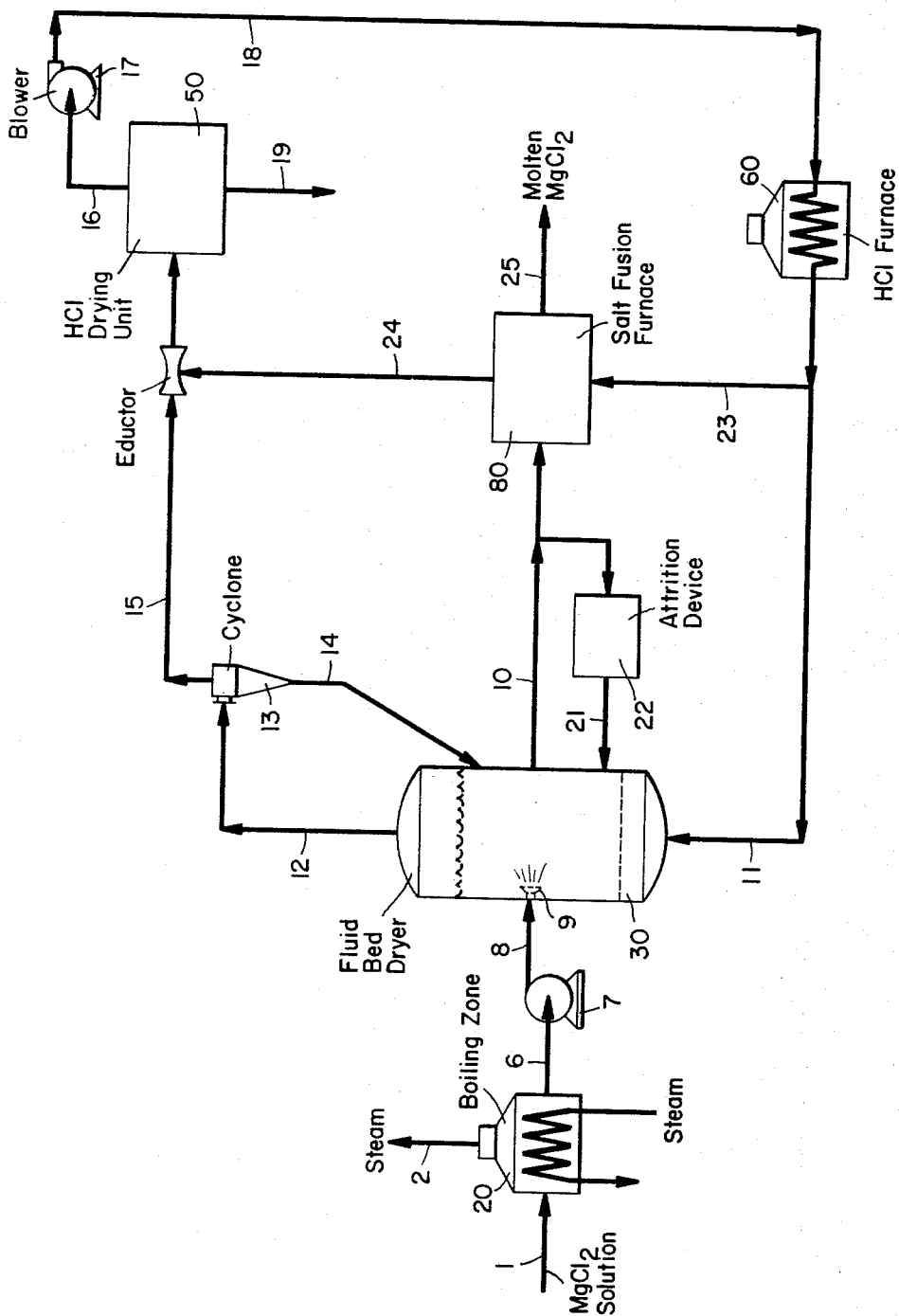

Murray Nadler, Morristown, N.J., assignor to Esso Research and Engineering Company, a corporation of Delaware
Filed May 4, 1965, Ser. No. 453,094
7 Claims. (Cl. 23—91)

The present invention is broadly concerned with the dehydration of magnesium chloride hydrates to produce anhydrous magnesium chloride which is sufficiently pure to be used as raw material for producing magnesium metal and chlorine in a specific type of electrolysis cell known commonly as an I.G. cell. An alternate type of electrolysis cell is available for producing magnesium metal from magnesium chloride known as the Dow cell. This cell utilizes magnesium chloride which is of significantly lower purity. However, with the Dow cell it is not possible to recover elemental chlorine as an electrolysis byproduct; instead HCl is produced.

This invention is specifically concerned with dehydration of magnesium chloride hydrates in an atmosphere in which the pressure and concentrations of HCl and water vapor are carefully controlled to certain fixed specifications, and with dehydration carried out in a manner such that an extremely high surface area of magnesium chloride hydrate relative to the amount of magnesium chloride hydrate is in intimate contact with the controlled atmosphere. The extremely high surface area of hydrate is obtained by carrying out the dehydration in a fluid bed of anhydrous magnesium chloride particles in which liquid magnesium chloride hydrate is sprayed onto particles of the fluid bed. The liquid hydrate forms a very thin coating over the particles of anhydrous magnesium chloride so that the dehydration process is accomplished with a maximum of surface of hydrate presented to the bulk drying gas. Alternate means of carrying out the dehydration is with a thin film evaporator in which the liquid magnesium chloride hydrate is coated as a thin film on the inner surface of a heated cylindrical tube with a rotating wiper, or a spray drier in which the hydrate is introduced into the hot controlled drying atmosphere as a fine spray.

It is known in the art that magnesium chloride occurring naturally in brines and ores can be separated from other salts and impurities yielding either a pure magnesium chloride solution in water or a pure solid hydrate of magnesium chloride known as bischofite, $MgCl_2 \cdot 6H_2O$. Either the brine or bischofite can be the starting material for the dehydration process covered by this invention. It is also known in the art that magnesium chloride can be dehydrated to a hydrate containing about four molecules of water of hydration per molecule of magnesium chloride by any conventional drying technique without incurring undesirable side reactions which cause accumulation of undesirable impurities. However, during further dehydration by known techniques to remove the remaining four waters of hydration an undesirable side reaction occurs. This reaction is the hydrolysis of magnesium chloride causing the formation of magnesium hydroxychloride and HCl. The amount of undesirable hydrolysis increases sharply as dehydration proceeds.

The hydrolysis side reaction is extremely undesirable because small amounts of hydrolysis product, magnesium hydroxychloride (more than 0.5 wt. percent), make the magnesium chloride unfit as feed to an I.G. cell. When this occurs further expensive processing is required to convert the magnesium hydroxychloride back to magnesium chloride before feeding the same to the cell. Also, the hydrolysis reaction results in a loss of recoverable chlorine in the form of HCl. This reduces the efficiency of the overall magnesium process. Therefore, it is evident that considerable economic incentive exists for developing a process for dehydrating magnesium chloride hydrates while avoiding the hydrolysis reaction.

Many conventional drying techniques have been tried to produce high purity anhydrous magnesium chloride. However, these techniques have not been very successful. Among these techniques tried are drying in fluid beds, fixed beds, spray driers, rotary driers (kilns), drum driers, etc. Drying gas atmospheres have included inert gas, air, HCl and combustion flue gas. The atmospheres have varied in water composition to very low water content and have varied in HCl concentration to very high HCl content. Some of the drying gas atmospheres which have been used may have had compositions which according to thermodynamic laws should prevent hydrolysis of magnesium chloride hydrates if in intimate contact with the hydrates. However, anhydrous magnesium chloride with sufficiently low amounts of magnesium hydroxychloride to be suitable directly for I.G. cell feed has not been produced. The reasons for this may be understood from the following discussion.

In accordance with the present invention two conditions must be met in order to achieve dehydration of magnesium chloride without hydrolysis. One is that the partial pressures of HCl and water in the atmosphere in which the dehydration is carried out must meet certain criteria. The other condition is that the controlled atmosphere must be in intimate contact with almost the entire hydrate.

For example, during dehydration the following reactions can occur:

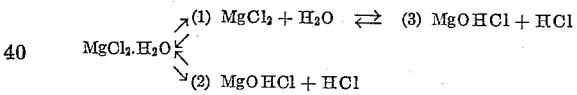

Theoretically, based on the laws of thermodynamics, decomposition by reaction 3 can be prevented by maintaining a ratio of partial pressure of HCl to water over the hydrate higher than a critical ratio, $K_1$. Again, theoretically decomposition by reaction 2 can be prevented by maintaining the HCl partial pressure above a critical pressure, $K_2$. Also, in order to dehydrate according to reaction 1 the partial pressure of water must be maintained below yet another critical pressure, $K_3$. The three critical values are functions of temperature only. They are tabulated as a function of temperature in Table I following.

TABLE I.—CRITICAL CONSTANTS AS FUNCTIONS OF TEMPERATURE

| Temperature, °F. | $K_1 = P_{HCl}/P_{H_2O}$ | $K_2 = P_{HCl}$, Atm. | $K_3 = P_{H_2O}$, Atm. |
|---|---|---|---|
| 77 | 11.75 | $7.71 \times 10^{-7}$ | $5.64 \times 10^{-6}$ |
| 172 | 7.02 | $6.44 \times 10^{-5}$ | $8.13 \times 10^{-5}$ |
| 260 | 4.82 | $1.54 \times 10^{-3}$ | $2.80 \times 10^{-4}$ |
| 350 | 3.59 | $1.75 \times 10^{-2}$ | $4.36 \times 10^{-3}$ |
| 440 | 2.86 | $1.20 \times 10^{-1}$ | $3.84 \times 10^{-2}$ |
| 530 | 2.38 | $5.73 \times 10^{-1}$ | $2.23 \times 10^{-1}$ |
| 620 | 2.03 | 2.03 | $9.42 \times 10^{-1}$ |
| 710 | 1.80 | 4.0 | 3.2 |
| 800 | 1.63 | 9.0 | 10.0 |

The criteria for a drying atmosphere in which hydrolysis will not occur at 620° F. is, referring to Table I, $K_1 = P_{HCl} > 2.0$
$K_2 = P_{HCl}/P_{H_2O} > 2.1$
$K_3 = P_{H_2O} < 0.94$ Although it should be possible to dehydrate magnesium chloride without decomposition under an HCl-water atmosphere, this has not been achieved in practice. The reasons for this are that the concentration of HCl and water vapor in the drying atmosphere did not satisfy the criteria previously discussed and that the bulk gas phase could not penetrate the internal porous structure of the salt particles. As dehydration occurred within the salt particles, a porous structure formed and there was a net flow of water vapor through the porous structure into the bulk gas phase. The water vapor concentration within the salt particles was higher and the HCl concentration was lower than in the bulk gas phase. Also, the ratio of the surface area to volume of the salt particles was relatively low so that much of the magnesium chloride hydrate was not in contact with any gas atmosphere. Therefore, hydrolysis via reaction 3 occurred at the internal pour surfaces and via reaction 2 in the salt crystal structure even if decomposition at the outer particle surface was prevented, i.e. by maintaining the proper HCl and water vapor partial pressures in the bulk gas to prevent hydrolysis of magnesium chloride.

Thus, it has been discovered that when the dehydration of magnesium chloride hydrates containing about four molecules of water per molecule of magnesium chloride to anhydrous magnesium chloride is carried out by spraying a melt of solution of the magnesium chlorine hydrate into a fluid bed of anhydrous magnesium chloride solids, fluidized with a gas which has a pressure and content of HCl and water vapor such that the critical conditions previously stated that are required to prevent hydrolysis are maintained, unexpected desirable results are achieved. These results are that, opposed to all previous experience, essentially anhydrous magnesium chloride is produced with only minor hydrolysis of magnesium chloride to magnesium hydroxychloride and with essentially no loss of chlorine as HCl. Thus, the product anhydrous magnesium chloride is suitable for use directly in an I.G. magnesium electrolysis cell without extensive further processing.

The process of the present invention may be readily understood by reference to the drawing illustrating an embodiment of same.

Referring to the drawing, an aqueous purified brine of magnesium chloride or, alternatively, purified bischofite is introduced into boiling zone 20 by means of line 1. In zone 20 the magnesium chloride is concentrated to about a 50 to 60 wt. percent preferably a 55 wt. percent magnesium chloride solution in water ($MgCl_2 \cdot 4.2$-$4.4H_2O$) by boiling at a temperature of about 345° to 365° F., preferably at 355° F. at atmospheric pressure. Steam is withdrawn overhead from zone 20 by means of line 2. The partially dehydrated melt of magnesium chloride is withdrawn from zone 20 by means of line 6 and while maintaining the liquid state at about 355° F. passed through pump or equivalent means 7 and then sprayed into fluid bed dryer zone 30 by means of line 8 and spray device 9.

The boiling zone 20 operates at atmospheric pressure and temperature is controlled at 355° F. to provide close to maximum removal of water (to about $MgCl_2 \cdot 4.2H_2O$) without encountering hydrolysis of magnesium chloride, and maintaining the effluent from zone 30 in the liquid phase. This is the most economical mode of operation. Control of temperature at very close to 355° F. is critical because at slightly higher, or lower, temperatures solid magnesium chloride hydrates form. A liquid effluent from the boiling zone 20 is required to carry out the subsequent spraying into fluid bed dryer 30.

The fluidized particles in a conventional fluid bed zone 30 are anhydrous magnesium chloride particles. These particles are maintained in a fluidized condition by a fluidizing HCl gas introduced into the bottom of zone 30 by means of line 11. HCl gas containing water is removed overhead from fluid zone 30 by means of line 12 and passed into a cyclone or equivalent separator 13 wherein fine solid particles of anhydrous magnesium chloride are separated and returned to the bed by means of line 14. The wet HCl gas stream is removed from cyclone 13 by means of line 15 and passed into conventional HCl drying unit 50 where water is removed from the HCl and anhydrous HCl is produced. Anhydrous HCl is removed from zone 50 by means of line 16, passed through blower or equivalent device 17 and then introduced into the HCl heating furnace 60 by means of line 18 where the gas is heated to the desired temperature and recirculated to fluid bed zone 30. Water is removed from zone 50 by means of line 19.

Anhydrous magnesium chloride particles are removed from fluid zone 30 by means of line 10. Seed fine particles of magnesium chloride which act as growth centers are added to fluid bed zone 30 by means of line 21 to stabilize fluid bed particle size distribution. The fines are generated by breaking down part of the solid effluent from the fluid bed in an attrition device 22 and are added to the fluid bed. The particle sizes may vary appreciably but are generally in the range from about 50–300 microns as, for example, 175 to 225 microns, preferably about 200 microns. As pointed out heretofore, it is essential that the film of liquid magnesium chloride deposited on the particles should be relatively thin, not exceeding about 20 microns and preferably having a film thickness in the range of about 3–10 microns, such as about .5 microns.

The anhydrous magnesium chloride withdrawn from zone 30 is preferably passed to a salt fusion furnace 80 wherein the same is contacted with hot hydrochloric gas introduced by means of line 23. This gas was withdrawn from zone 80 by means of line 24 and recycled to the HCl drying unit 50. The partial pressure of HCl to water in zone 80 ($K_4$) should be below about 11.2 since the temperature maintained in zone 80 is in the range of about 1320° to 1350° F., preferably about 1325° F. A high quality, molten, anhydrous magnesium chloride is withdrawn from zone 80 by means of line 25 and passed to an electrolytic cell.

The temperature in zone 30 is maintained in the range from 500° F., which is the lowest practical temperature at which anhydrous magnesium chloride can be formed, to about 700° F., which is the highest practical fluid bed temperature which can be used without encountering bogging and agglomeration of particles due to softening of anhydrous magnesium chloride. A desirable temperature is in the range from about 575° to 675° F. such as about 600° F. The melting point of anhydrous magnesium chloride is 1317° F. The combined HCl and water partial pressure in fluid bed zone 30 required to meet the criteria for preventing hydrolysis, previously given, varies from about 0–75 p.s.i.g. depending on the operating temperature. Higher total pressure is required if other gases are present.

The relative weights of anhydrous magnesium chloride in the fluid bed zone 30 to the rate of feed of magnesium chloride hydrate to zone 30 required to achieve satisfactory dehydration varies with both bed temperatures and water vapor concentration in the offgas from zone 30. These weights will be in the range of about 1 to about 13 wts./wt./hr. The heat required to accomplish the dehydration of magnesium chloride may be provided by any or a combination of several means. These include indirectly preheating the recirculating anhydrous HCl gas stream in a furnace sufficiently above the fluid bed temperature to provide the necessary heat of dehydration as sensible heat released in the bed as the HCl cools to bed temperature. This is the technique used in the process of FIGURE 1. A high HCl recirculation rate is required with this technique to provide the required heat to the bed. Alternatively, a fuel can be fired with air in a separate chamber and the hot flue gas fed to the bed along with HCl. This technique eliminates the HCl heating furnace but requires removal of nitrogen CO, $CO_2$ and water of combination of the fuel from recirculating HCl. Higher pressure in fluid bed zone 30 is required. Another means of providing heat of hydration is indirect heating of the fluid bed with a hot medium transferring heat through heat exchange surfaces in the bed. This procedure has the advantage of requiring a lower HCl recirculation rate than with the HCl preheat technique.

The present invention may be more fully understood by the following example illustrating the same.

*Example*

A fluid bed is operated at a temperature of about 620° F. The recirculating fluidizing anhydrous HCl stream is preheated to about 1220° F. in the HCl furnace. The 1220° F. temperature approaches the melting point of magnesium chloride, so that it is close to the highest practical HCl preheat temperature which can be used without encountering sticking of the fluid bed around the bottom gas inlet of zone 30. It is very desirable to preheat the HCl to the highest practical temperature because this minimizes the amount of HCl which must be recirculated to provide the necessary heat of dehydration.

At these conditions, it is necessary to recirculate about 740 lbs. of HCl for every 100 lbs. of $MGCl_2 \cdot 4.2H_2O$ water in order to provide the heat to fluid bed zone 30 to accomplish the dehydration. The pressure in the bed is about 2.35 atmospheres. This is the minimum presure at which the criteria for preventing hydrolysis and the heat balance will be satisfied. At this pressure, the HCl partial pressure is about 2.10 atmospheres which is higher than the $K_2$ value at 620° F. of 2.03. The ratio of partial pressure of HCl to water in the offgas is 8.4 which is higher than the value of $K_1$ at 620° F. of 2.03. The partial pressure of water in the offgas is 0.25 atmospheres which is less than the value of $K_3$ at 620° F. of 0.9. Therefore, all the criteria for preventing hydrolysis of magnesium chloride hydrates in contact with the fluid bed gas are satisfied and drydrolysis will not occur where the magnesium chloride hydrate is in contact with fluid bed gas.

Thus, by the present technique of spraying a melt of dehydrated magnesium chloride into a fluid bed of magnesium chloride the hydrate deposits as a very thin film over the particles of anhydrous magnesium chloride. Sufficiently high HCl rate and fluid bed pressure is used so that the criteria for preventing hydrolysis are met. Negligible hydrolysis occurs with the spray fluid bed technique because almost the entire hydrate is in intimate contact with the bulk gas phase.

As mentioned heretofore the anhydrous magnesium chloride from fluid bed zone 30 is passed into salt fusion furnace 80 through line 22. Here the salt is melted prior to feeding to the magnesium electrolysis cell. The temperature in furnace 80 is maintained above 1317 °F. at atmospheric pressure (which is the normal melting point of anhydrous magnesium chloride). The anhydrous magnesium chloride introduced into zone 80 may contain a trace of water present as a hydrate. This small amount of water could hydrolyze magnesium chloride in the fusion furnace. However, hydrolysis in the salt fusion furnace is prevented by dispersing anhydrous HCl gas into the molten salt in furnace 80 via line 23. Sufficient HCl is required to maintain the ratio of partial pressure of HCl to water in the offgas from zone 80 above a critical value, $K_4$. $K_4$ is a function of temperature only and is tabulated against temperature in Table II.

TABLE II

| Temperature, ° F. | $K_4 = P_{HCl}/P_{H_2O}$ at $P_{HCl} + P_{H_2O} = 1$ atm. |
|---|---|
| 77 | 0 |
| 172 | |
| 260 | .001 |
| 350 | |
| 440 | .0142 |
| 530 | |
| 620 | .0955 |
| 710 | |
| 800 | .405 |
| 980 | 1.44 |
| 1,160 | 4.70 |
| 1,317 | 11.2 |

It is desirable to operate zone 80 at the lowest temperature at which magnesium chloride can be maintained in the molten state, say, 1320–1350° F. This is because less HCl is required to prevent hydrolysis at lower temperatures. At 1320° F. about 12 weights of HCl per weight of water left in the magnesium chloride is required. Wet HCl gas is taken overhead from zone 80 and introduced into line 15 using an eduction device. From there it is passed to the HCl drying unit along with wet HCl gas coming from zone 30.

What is claimed is:
1. Process for the dehydration of hydrous magnesium chloride which comprises maintaining a thin film of liquid hydrous magnesium chloride at a temperature in the range from about 500° to 700° F. in a hydrogen chloride atmosphere wherein the partial pressure of the hydrogen chloride is in the range from 0.3 to 4.0 atmospheres and wherein the ratio of the partial pressure of the hydrogen chloride to the partial pressure of water is in the range from about 2.5 to 1.8.

2. Process as defined by claim 1 wherein the film has a thickness less than about 20 microns.

3. Process as defined by claim 2 wherein said hydrous magnesium chloride has from about 4.2 to 4.4 molecules of water of hydration.

4. Process for the dehydration of hydrous magnesium chloride which comprises spraying a liquid stream of said hydrous magnesium chloride into a fluid bed of particles of anhydrous magnesium chloride fluidized by a gas comprising hydrogen chloride under conditions to deposit a thin film of liquid hydrous magnesium chloride on said anhydrous particles, said fluid bed being maintained at a temperature in the range from about 500° to 700° F. and under conditions where the partial pressure of the hydrogen chloride is in the range from about 0.3 to 4.0 atmospheres and wherein the partial pressure of the hydrogen chloride as compared with the partial pressure of water is in the range from about 2.5 to 1.8.

5. Process as defined by claim 4 wherein the film of liquid anhydrous chloride deposited on said anhydrous magnesium chloride particles is less than about 20 microns.

6. Process as defined by claim 5 wherein the film thickness is in the range from about 3–15 microns.

7. Process as defined by claim 4 wherein the temperature in said fluidization zone is about 620° F., wherein the partial pressure of hydrogen chloride is about 2.1 and wherein the ratio of the partial pressure of the hydrogen chloride to the partial pressure of the water is about 2.1.

References Cited

UNITED STATES PATENTS

| 1,835,818 | 12/1931 | Smith et al. | 23—91 |
| 1,896,406 | 2/1933 | Heath | 23—91 |
| 1,903,592 | 4/1933 | Lacell | 23—91 |
| 2,417,772 | 3/1947 | Marek | 23—91 |
| 3,181,930 | 5/1965 | Olsen | 23—91 |
| 3,275,409 | 9/1966 | Schubert et al. | 23—91 |

OSCAR R. VERTIZ, *Primary Examiner.*

EDWARD STERN, *Assistant Examiner.*